(12) United States Patent
Rosenberg et al.

(10) Patent No.: US 9,670,074 B2
(45) Date of Patent: Jun. 6, 2017

(54) NANOPOROUS SILICA POLYAMINE COMPOSITES WITH SURFACE-BOUND ZIRCONIUM (IV) AND METHODS OF USE

(71) Applicant: The University of Montana, Missoula, MT (US)

(72) Inventors: Edward Rosenberg, Missoula, MT (US); Varadharajan Kailasam, Towanda, PA (US); Daniel Nielsen, Burlington, VT (US)

(73) Assignee: The University of Montana, Missoula, MT (US)

( * ) Notice: Subject to any disclaimer, the term of this patent is extended or adjusted under 35 U.S.C. 154(b) by 0 days.

(21) Appl. No.: 14/073,742

(22) Filed: Nov. 6, 2013

(65) Prior Publication Data
US 2014/0066529 A1    Mar. 6, 2014

Related U.S. Application Data

(63) Continuation of application No. 13/069,238, filed on Mar. 22, 2011, now abandoned.
(Continued)

(51) Int. Cl.
*C02F 1/42* (2006.01)
*B01J 20/22* (2006.01)
(Continued)

(52) U.S. Cl.
CPC ............. *C02F 1/42* (2013.01); *B01J 20/3204* (2013.01); *B01J 20/3236* (2013.01); *B01J 20/3272* (2013.01); *B01J 20/345* (2013.01); *B01J 20/3433* (2013.01); *C02F 1/285* (2013.01); *C02F 2101/103* (2013.01)

(58) Field of Classification Search
None
See application file for complete search history.

(56) References Cited

U.S. PATENT DOCUMENTS 5,695,882 A    12/1997   Rosenberg
5,804,616 A *  9/1998   Mowrer ............ C08G 59/4085
                                                106/287.11
(Continued)

OTHER PUBLICATIONS

Tramontini, Maurillo, and Luigi Angiolini; "Mannich Bases-Chemistry and Uses"; Sep. 16, 1994; CRC Press; p. 2.*
(Continued)

*Primary Examiner* — Richard Gurtowski
(74) *Attorney, Agent, or Firm* — Jean Kyle

(57) ABSTRACT

Silica polyamine composites (SPC) made from silanized amorphous nano-porous silica gel and poly(allylamine) (BP-1) were functionalized with phosphorus acid using the Mannich reaction, resulting in a phosphonic acid modified composite (BPAP). Zirconium (IV) was immobilized on BPAP. Arsenate anions strongly adsorbed on the ZrBPAP composite in the pH range 2 to 8, while arsenite only adsorbed well at pH 10. Regeneration of the resin was carried out successfully for As(V) and As(III) using $2M-H_2SO_4$. Four adsorption/desorption cycles were performed for As(V) at pH 4 without significant decrease in the uptake performance. ZrBPAP capture capacity and kinetics for arsenate were tested for longevity over 1000 cycles with only a marginal loss of performance.

11 Claims, 10 Drawing Sheets

Related U.S. Application Data

(60) Provisional application No. 61/316,344, filed on Mar. 22, 2010.

(51) Int. Cl.

| | |
|---|---|
| B01J 49/00 | (2006.01) |
| C02F 1/28 | (2006.01) |
| B01J 20/32 | (2006.01) |
| B01J 20/34 | (2006.01) |
| C02F 101/10 | (2006.01) |

(56) References Cited

U.S. PATENT DOCUMENTS

| | | | |
|---|---|---|---|
| 5,997,748 A | 12/1999 | Rosenberg et al. | |
| 6,576,590 B2* | 6/2003 | Rosenberg et al. | 502/401 |
| 7,008,601 B2* | 3/2006 | Rosenberg et al. | 423/24 |
| 2003/0162978 A1* | 8/2003 | Brockmann et al. | 548/470 |
| 2008/0207842 A1* | 8/2008 | Barthel | C08G 18/61 |
| | | | 525/418 |

OTHER PUBLICATIONS

Suzuki, T.M. et al.; Adsoprtion and Removal of Oxo-anions of Arsenic and Selenium on the Zirconium (IV) Loaded Polymer Resin Functionalized with Diethylenetriamine-N,N,N,N-Polyacetic Acid. J.Enviorn.Monit., 2000, 550-555,2. (From IDS of Parent Case U.S. Appl. No. 13/069,238, filed Oct. 11, 2012 of which this case is a continuation).*

Anderson, C.,et al.;Single Step Separation and Recovery of Palladium Using Nitrogen Species Catalyzed Pressure Leaching and Silica Polyamine Composites. Proceedings of the 5th International Symposium on Hydrometallurgy, 2003, p. 393, vol. 1—Leaching and Purification, Ed. Courtney Young, TMS, Warendale, PA.

Balaji,T.;Matsunaga,H.;Adsorption Characteristics of As(III) and As(V) with Titanium Dioxide Loaded Amberlite XAD-7 Resin. Analytical Science, 2002, 1345-1349, 18.

Balaji,T., et al.; Adsorption and Removal of As(V) and As(III) using Zr-loaded Lysine Diacetic Acid Chelating Resin. Chemosphere, 2005, 1169-1174, 59.

Beatty,S.T., et al.; A comparative Study of the Removal of Heavy Metal Ions from Water using a Silica Polyamine Composite and a Polystyrene Chelator Resin. Ind. Eng. Chem. Res., 1999, 4402-4408, 38(11).

Cheng,R.C.,et al.; Enhanced Coagulation of Arsenic Removal. J.Am. Water Works Assoc., 1994, 79-90, 86.

Fish, R.H., et al.; Polymer-Pendent Ligand Chemistry 1. Reactions of Organoarsenic Acids and Arsenic Acid with CAtechol Ligands Bonded to Polystyrene-Divinyl Benzene. Inorg Chem.,1985, 4456-4458, 24.

Ghosh,A. et al.; TCLP Underestimates Leaching of Arsenic from Solid Residuals under Landfill Conditions. Environmental Science and Technology, 2004, 4677-4682, 38(17).

Ghurye,G.L.,et al.; "Combined Arsenic and Nitrate Removal by Ion Exchange", J. Am. Water Works Assoc.,1999, 85-96, 91(10).

Hughes, M.; Rosenberg,E.; Characterization and Applications of Poly-acetate Modified Silica Polyamine Composites. Sep. Sci. Tech., 2007, 261-283, 42.

Kailasam,V. et al.; Characterization of Surface-Bound Zr(IV) and Its Application to Removal of As(v) and As(III) from Aqueous Systems Using Phosphonic Acid Modified Nanoporous Silica Polyamine Composites. Ind. Eng. Chem. Res. 2009, 3991-4001, 48.

Kaltreider,R.C.et al.; Arsenic Alters the Function of the Glucocortocoid Receptor as a Transcription Factor. Environ. Health Persp., 2001, 245-251, 109(3).

Kramer,J., et al.; Highly Selective and Efficient Recovery of Pd, Pt and Rh from Precious Metal-Containing Industrial Effluents with Silica based (Poly)amine Ion Exchangers. Sep. Sci. and Tech., 2004, 63-75, 39.

Li,Z. et al.; Sequential Determination of Arsenite and Arsenate by Ion Chromatography. Anal.Chim.Acta., 1995, 79-87, 307.

Mandal, B.K.; Suzuki, K.T.; Arsenic Round the World: a Review. Talanta, 2002, 201-235, 58(1).

Manna, B. et al.; Crystalline hydrous Titanium (IV) Oxide (CHTO): An Arsenic (III) Scavenger from natural Water. J. Water Supply: Res. & Tech.—AQUA, 2004, 483-495, 53(7).

Manning, B.A.; Burau, A.G.; Selenium Immobilization in Evaporation Pond Sediments by in situ Precipitation of Ferric Oxyhyroxide. Env. Sci. and Tech., 1995, p. 2639, 29.

McNeill, L.S.; Edwards,M.; Soluble Arsenic Removal at Water Treatment Plants. J. Am. Water Works Assoc., 1995, 105-113, 87(4).

Meng,X. et al.; Redox Transformations of Arsenic and Iron in Water Treatment Sludge During Aging and TCLP Extraction. Environmental Science & Technology, 2001, 3476-81, 35(17).

Moedritzer, K.; Irani, R.R.; The Direct Synthesis of a-Aminomethylphosphonic Acids. Mannich-Type Reactions with Orthophosphorus Acid. Journal of Organic Chemistry, 1966, 1603-1607, 31(5).

Moller, T.; Sylvester, P.; Effect of Silica and pH on Arsenic Uptake by Resin/Iron Oxide Hybrid Media. Water Research, 2008, 1760-1766, 42(6-7).

Munoz, J.A. et al.; Kinetic and Dynamic Aspects of Arsenic Adsorption by Fe(III)-Loaded Sponge. J. Solution Chem., 2008, 553-565, 37(4).

Ramana, A.; Sengupta, A.K.; Removing Selenium (IV) and Arsenic(V) Oxyanions with Tailored Chelating Polymers. J. Environ. Eng., 1992, 755-775, 118.

Rau,I. et al.; Modelling the Arsenic (V) and (III) Adsorption. Czechoslovak Journal of Physics, 2003, 549-556, 53(A-2).

Rosenberg, E. et al.; Structural Investigations of Silica Polyamine Composites: Surface Coverage, Metal Ion Co-ordination, and Ligand Modification. Ind. Eng. Chem. Res., 2006, 6538-6547, 45(19).

Rosenberg, E. et al.; Proceedings of the 67th International Water Conference 2007, p. 34, IWC 06.

Rosengrant, L.; Fargo, L.; Final Best Demonstrated Available Technology (BDAT) Background Document for K031, K084, K101, K102, Characteristic Arsenic Wastes (D004) Characteristic Selenium Wastes (D010) and P and U Wastes Containing Arsenic and Selenium Listing Constituents vol. 1. EPA/530/SW-90/059A., 1990, p. 136.

Sarkar,S. et al.; Use of ArsenXnp, a Hybrid Anion Exchanger, for Arsenic Removal in Remote Villages in the Indian Subcontinent, Reactive & Functional Polymers, 2007, 1599-1611, 67(12).

Shaw, J.K. et al.; Stabilization of Arsenic-Bearing Solid Residuals in Polymeric Matrices. Journal of Hazardous Materials, 2008, 1115-1121, 152(3).

Shiraishi, Y. et al.; Separation of Transition Metals using Inorganic Adsorbents Modified with Chelating Ligands. Indurtrial & Engineering Chemistry Research, 2002, 5065-5070, 41(20).

Streat, M.; Applications of Ion Exchange in Hydrometallurgy NATO ASI Series, Series E: Applied Sciences, 1986, 449-461, 107, (Ion Exch. Sci. Technol.).

Sun, H. et al.; Treatment of Groundwater Polluted by Arsenic Compounds by Zero Valent Iron. Journal of Hazardous Materials, 2006, 297-303, 129.

Suzuki, T.M. et al.; Adsorption and Removal of Oxo-anions of Arsenic and Selenium on the Zirconium(IV) Loaded Polymer Resin Functionalized with Diethylenetriamine-N,N,N,N-Polyacetic Acid. J. Environ. Monit., 2000, 550-555, 2.

Vatutsina,O.M. et al.; New Hybrid (Polymer/Inorganic) Fibrous Sorbent for Aresenic Removal from Drinking Water. Reactive & Functional Polymers, 2007, 184-201, 67.

Zagorodni, A.A.,et al.; Infrared Spectroscopy of Ion Exchange Resins: Chemical Deterioration of the Resins. Reactive & Functional Polymers, 2002, 157-171, 53.

Zagorodni, A.A.; Ion Exchange Materials Properties and Applications, ; 2007,243-262, Chapter 11, Elsevier: Oxford, UK.

* cited by examiner

NANOPOROUS SILICA POLYAMINE COMPOSITES WITH SURFACE-BOUND ZIRCONIUM (IV) AND METHODS OF USE

CROSS-REFERENCE TO RELATED APPLICATIONS

This application is a continuation of co-pending application Ser. No. 13/069,238, filed Mar. 22, 2011, which claims the benefits of U.S. Provisional Application No. 61/316,344 filed Mar. 22, 2010, the disclosures of which are hereby incorporated by reference in its entirety including all figures, tables and drawings.

STATEMENT REGARDING FEDERALLY SPONSORED RESEARCH OR DEVELOPMENT

This invention was made in part with Government support under Grant No. NSF 07090738 awarded by the National Science Foundation. The government has certain rights in the invention.

REFERENCE TO SEQUENCE LISTING, A TABLE, OR COMPUTER PROGRAM LISTING COMPACT DISC APPENDIX

Not Applicable

BACKGROUND OF THE INVENTION

The remediation of arsenic from contaminated surface waters is a problem worldwide (Mandal, 2002). In terms of acute toxicity of inorganic arsenic; As(III) is more toxic than As(V). Either arsenate or arsenite can be the dominant form in aqueous systems depending on the reduction potential of the environment. Arsenate generally is the dominant form in oxic waters while arsenite dominates in sulfidic and anaerobic waters including deeply circulating geothermal waters. In strongly sulfidic environments that are near saturation with respect to a naturally occurring arsenic mineral, orpiment ($As_2S_3$), arsenic sulfide complexes may form with a generic formula $H_nAs_3S_6^{(n-3)}$ (Li, 1995).

The toxicity of arsenic to humans at low concentrations has led to increased interest in arsenic remediation chemistry (Li, 1995). Drinking water standards for arsenic in many countries (USA and Europe) have been lowered to 10 ppb. Past research for remediation of arsenic contaminated water sources has focused on removal of arsenic by adsorption (Kaltreider, 2003; Ghurye, 1999; Balaji, 2002; 2005) or co-precipitation processes (the so-called ferrihydrite process). Initially, addition of ferric chloride to water to produce a precipitate of ferric hydroxide was a favored method of arsenic remediation (Cheng, 1994), and later this method was replaced by the use of a fixed bed of iron filings (McNeill, 1995). Both of these methods are often referred to as the "ferrihydrite process". More recently using fixed beds of zirconium, titanium and (to a lesser degree) aluminum oxides are by far the most favored approach for drinking water and there are thousands of these systems operating successfully in the USA ranging from systems designed to treat water at a single faucet to systems treating thousands of gallons of water per minute (Sun, 2006; Manna, 2004). However, all of these technologies have the significant disadvantage of creating a large amount of sludge for ultimate disposal; also the arsenic cannot be recovered and there is the possibility of leakage/leaching of colloidal oxides into the aquifer (Rosengrant, 1990; Manning 1995; Ghosh, 2004; Shaw, 2008; Meng, 2001). Other methods suffer from a lack of specificity, low selectivity over sulfate (ion exchange), low mass-to-volume concentrations (bio-reduction), and/or high cost (membrane technologies).

Recently, anion exchange resins based on polystyrene and containing quaternized ammonium sites doped with iron have become available which claim significant arsenic selectivity over sulfate (ASM-10-HP, Resintech Inc., West Berlin, N.J.; Moller, 2008; Sarkav, 2007; Munoz, 2008; Rau, 2003). Polystyrene resins modified with oxoanion chelating ligands have also shown promise but have yet to be commercialized (Streat, 1986; Fish, 1985). More recently polystyrene modified with poly-dentate ligands and Zr(IV) has shown selectivity for arsenate and selenate over sulfate but was only effective over a very narrow pH range (Suzuki, 2000). This approach offers the possibility of actively tuning anion selectivity by varying the metal and the cation-anion coordination environment. However, conventional polymeric resins suffer from shrink/swell changes depending on the pH and are not very stable at extreme conditions of pH and temperature (Zagorodni, 2002).

Among the commercialized metal sequestration technologies used today, silica polyamine composites (SPC) are relatively new and have been used very recently in the successful recovery and removal of transition metals, precious metals and mercury from diverse waste streams and mining leaches (Hughes, 2007; Beatty, 1999; U.S. Pat. Nos. 5,695,882; 5,997,748; 6,576,590; 7,008,601). Comparing these polymer modified silica with chelating materials prepared by directly modifying an amino-propyl functionalized silica gel surface, it was found that these materials suffer from degradation in the presence of base, have insufficient mechanical stability, and relatively low capacities due to poor surface coverage.

A need remains for a cost efficient, effective method of removing arsenic from contaminated water sources. The subject means should be highly selective, have a high capacity, and be stable over a long useful life.

All patents, patent applications, provisional patent applications and publications referred to or cited herein, are incorporated by reference in their entirety to the extent they are not inconsistent with the teachings of the specification

BRIEF SUMMARY OF THE INVENTION

Silica polyamine composites (SPC) made from silanized amorphous nano-porous silica gel and poly(allylamine) (BP-1) were functionalized with phosphorus acid using the Mannich reaction, resulting in a phosphonic acid modified composite (BPAP). Successful immobilization of the phosphonic acid ligand was confirmed by mass gain, elemental analysis, IR, and solid-state NMR. The modified composite had a ligand loading of 1.5 mmol/g, corresponding to N/P ratio of 0.73. Zirconium (IV) was immobilized on BPAP with a loading of 1.12 mmol/g. Zirconium loading was analysed by mass gain, ICP/AES, and SEM/EDX. Arsenate anions strongly adsorbed on the ZrBPAP composite in the pH range 2 to 8, while arsenite only adsorbed well at pH 10. The sorption mechanism is a chelation between arsenate or arsenite and Zr(IV)-phosphonic acid complex of BPAP. Adsorption isotherm data were found to be well modeled by the Langmuir equation for As(V) at pH 4 with $K_{ads}$=0.016L/g and $Q_m$=98 mg/g; at pH 6 with $K_{ads}$=0.018 L/g and $Q_m$=56 mg/g. Regeneration of the resin was carried out successfully for As(V) and As(III) using 2M-$H_2SO_4$. Four adsorption/desorption cycles were performed for As(V) at pH 4 without significant decrease in the uptake performance. ZrBPAP capture capacity and kinetics for arsenate were tested for longevity over 1000 cycles with only a marginal loss of performance. This composite is highly selective for arsenate over sulfate ($As/SO_4^{2-}$=50/1) and selenate (As/Se=20/1); lower selectivity was observed with Fe(III) and Th(IV) loaded BPAP (Kailasam, 2009).

DETAILED DESCRIPTION OF THE INVENTION

The ZrBPAP polyamine composite of the subject invention possesses the properties needed for an effective arsenate removal and recovery material. It has: 1) high selectivity for arsenate over sulfate, chloride, and selenate; 2) rapid sorption kinetics; 3) significant capacities over a wide pH range; 4) the ability to be recovered using an economical regeneration agent; 5) a long usable lifetime under the conditions encountered with most surface and wastewater streams. In addition there was also no appreciable leaching or leakage of zirconium (IV) during the repeated column cycles due to the remarkable stability of the composite.

ZrBPAP has better arsenic capacity and faster mass loading kinetics when compared to earlier work done using ZrEDTA (Suzuki, 2000) and Zr-loaded lysine diacetic acid (ZrLDA) polystyrene chelating resin (Balaji, 2002; 2005). Although in these earlier studies the arsenic feed concentration used was much lower (1-10 mg/L) than tested with the subject composite (0.238-1650 mg/L), the equilibrium batch tests showed that ZrBPAP only needed 8 hours or less for complete equilibration of the arsenic species under study whereas the equilibration time needed for other polymer resins such as ZrEDTA and ZrLDA are much longer (1-7 days). The ZrEDTA resin only worked effectively at pH 4 and both the ZrEDTA and ZrLDA polystyrene resins had lower capacities and did not demonstrate selectivity for arsenate over selenate.

ZrBPAP was compared with the commercially available-iron doped strong base anion exchange resin, ASM-10HP made by Resintech, Inc., West Berlin, N.J. The capacity of this material for arsenate, at pH=6 was 40 mg/g compared with 56 mg/g for ZrBPAP. Both showed good selectivity for arsenate over sulfate. It should also be pointed out that the column utilization factor was 0.15 for ASM-10HP and 0.63 for ZrBPAP. This higher column utilization factor is typical of SPC materials relative to polystyrene analogs and points to the better capture kinetics of the silica based ion exchange materials (Rosenberg, 2007).

Figure 1:
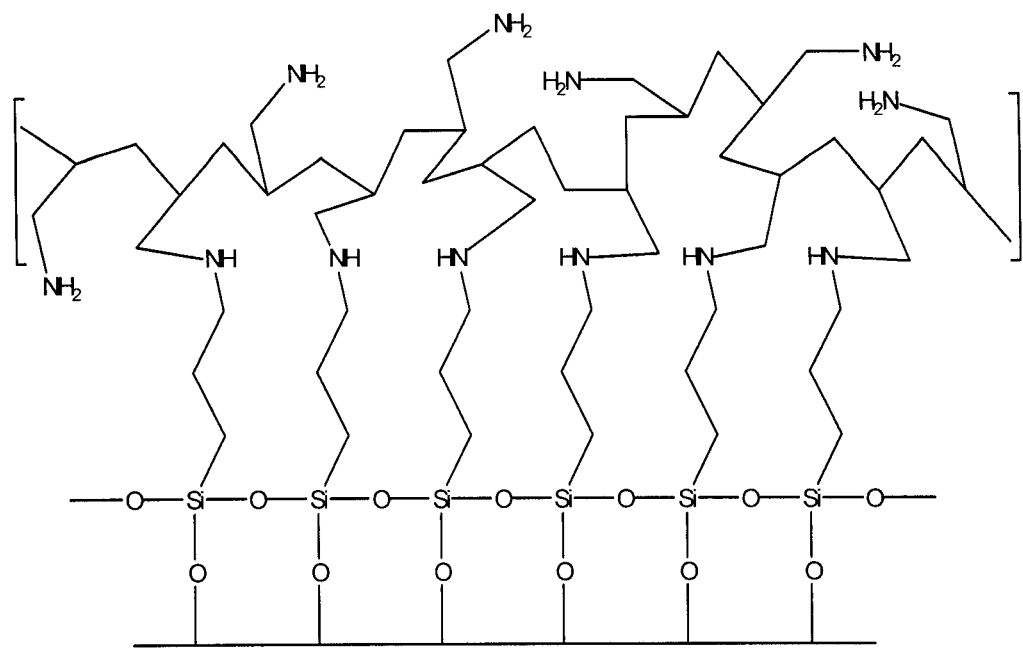
FIG. 1 is a schematic representation of the surface structures of BP-1 (made with chloropropyltrichlorosilane, left) and BP-1M (made with 7.5:1 mixture of methyltrichlorosilane and chloropropyltrichlorosilane, right) composites, made with polyallylamine (PAA), which is a straight-chain, water-soluble, all primary amine polyamine (MW=11,000).
Figure 1:
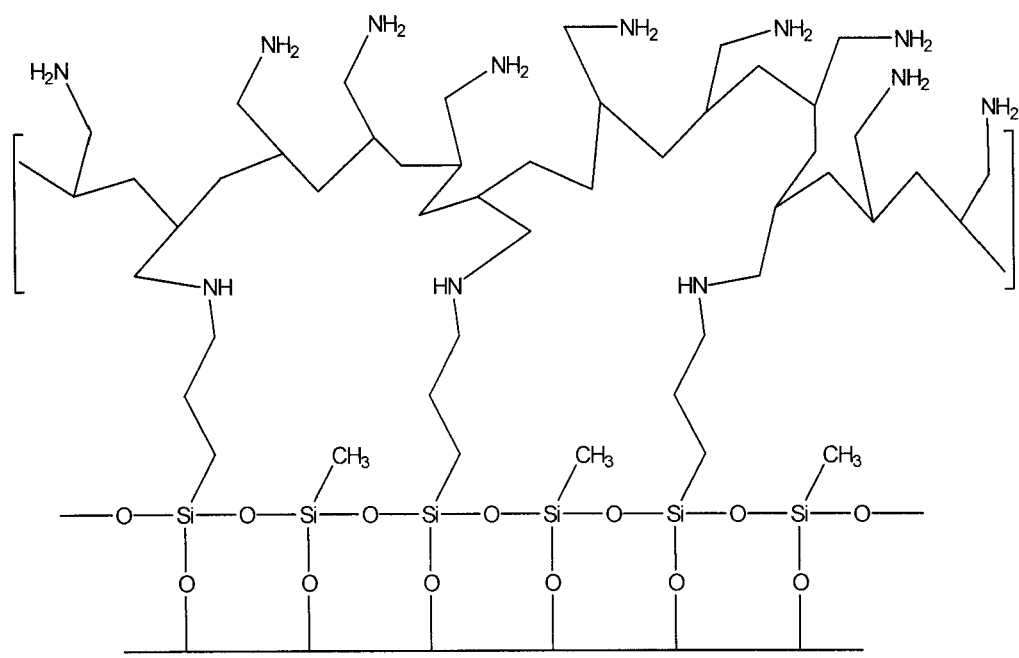

The silica polyamine composite materials discussed herein were designed to provide the higher capacities associated with polystyrene while providing the mechanical stability and better mass transfer kinetics associated with silica based solid phase adsorbents. They are currently in commercial production and are made by silanisation of the surface hydroxyl groups on amorphous silica gels with chloropropyl trichlorosilane or with a mixture of methyl trichlorosilane and chloropropyl trichlorosilane (FIG. 1) (U.S. Pat. Nos. 5,695,882; 5,997,748; 6,576,590; and 7,008,601). The mixed silane motif results in improved capacity, surface coverage and mass transfer kinetics. Composites made with only chloropropyl trichlorosilane are referred to as BP-1 while those made with the mixed silane are referred to as BP-1M. The amine groups on BP-1 or BP-1M can then be modified with various metal selective ligands (Hughes, 2007; U.S. Pat. No. 6,576,590).

Previous studies on the applications of these polyamine composites have focused on selective extractions of specific metal cations from aqueous streams (Kramer, 2004; Shiraishi, 2002; Anderson, 2003). The subject polyamine composites are designed for selective anion capture. A highly charged metal is bound to a polyamine composite functionalized with a ligand that binds the metal irreversibly. The resulting immobilized metal silica polyamine composite (IMPAC) should show anion selectivity depending on:
1. The net charge on the metal (electrostatic attraction)
2. The polarizability of the anion (covalent interactions)
3. The steric environment around the metal (coordination number)
4. The hydration energy and Bronsted acidity of the anion (solution behavior) These factors can be represented by the following chemical equilibria (Equation 1)

$$L_nM^{m+} + M'(O)_x^{y-}(aq) \rightleftharpoons L_xM^{n+}(M'O_x)^{m-y} \quad (1)$$

where, L—Ligand bound to silica polyamine composite,
M—Immobilized metal,
M'—Metal of the oxo-anionic species.

Figure 2A:
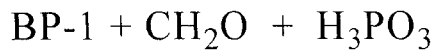
FIG. 2A is a schematic representation of the phophonic acid modified BP-1 polyallylamine composite (BPAO).
Figure 2A:
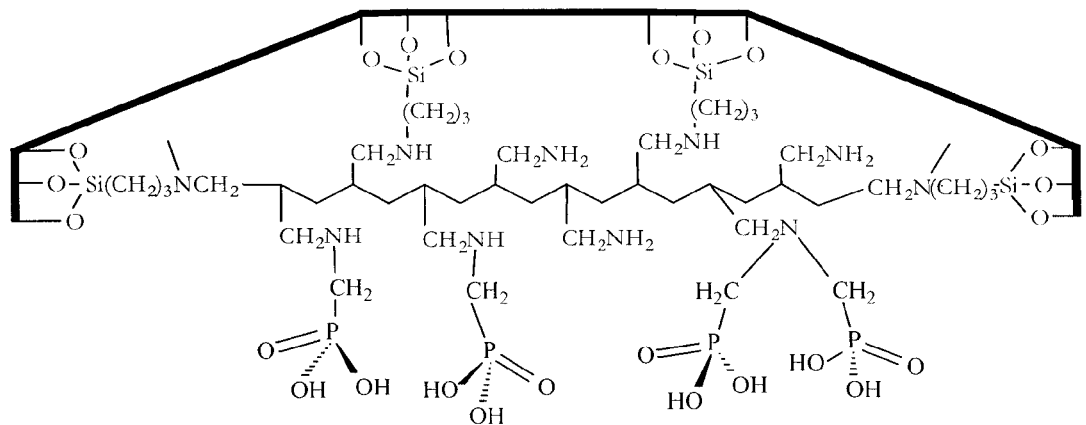
Figure 2B:
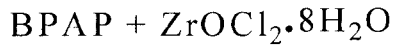
FIG. 2B is a schematic representation of ZrBPAP.
Figure 2B:
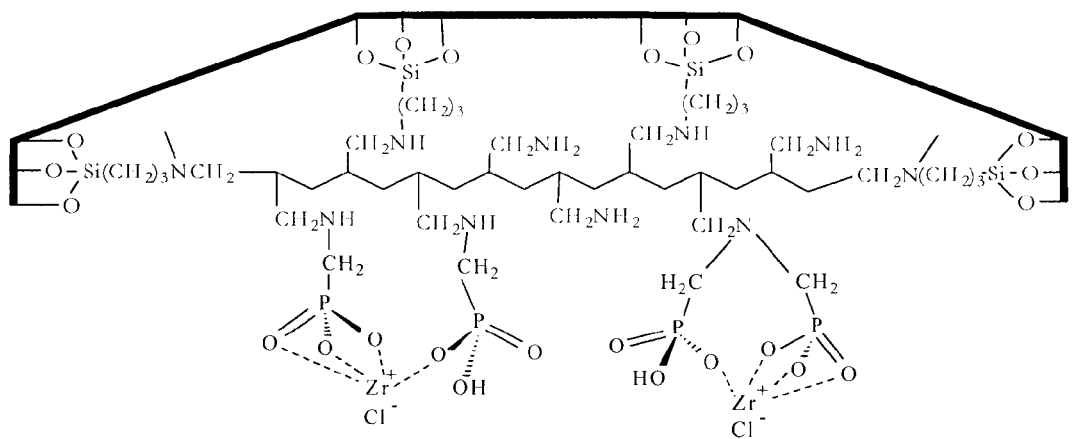

A phosphonic acid modified silica polyamine composite (FIG. 2a), BPAP, was synthesized and Zr(IV) was immobilized on the composite (FIG. 2b).

The following examples are offered to further illustrate but not limit both the compositions and the methods of the present invention. All percentages are by weight and all solvent mixture proportions are by volume unless otherwise noted.

EXAMPLE 1

Materials

Silica gel (267 A° pore diameter, 2.82 mL/g pore volume, 84.7% porosity, 422 m$^2$/g surface area) was obtained from INEOS enterprises Ltd., UK, and was sieved to 150-250 microns. All chemicals were reagent grade and were purchased from Sigma-Aldrich Co. Stock solutions of Zr(IV), Fe(III), Th(IV), As(III), As(V), Se(IV), and Se(VI) were prepared using zirconyl chloride ($ZrOCl_2 \cdot 8H_2O$), ferric sulfate ($Fe_2(SO_4)_3 \cdot 4H_2O$), thorium nitrate ($Th(NO_3)_4 \cdot xH_2O$), sodium meta-arsenite ($NaAsO_2$), sodium hydrogen arsenate ($Na_2HAsO_4 \cdot 7H_2O$), sodium selenite ($Na_2SeO_3$), and sodium selenate ($Na_2SeO_4$) respectively. Solution pH was adjusted from the intrinsic pH, where necessary, using hydrochloric acid and sodium hydroxide. Stripping and recovery of arsenic was achieved with $2M-H_2SO_4$. Metal standards for AA and ICP analysis were obtained from Fisher Scientific Co.

Infrared characterization of modified composites was carried out with a Thermo-nicolet Nexus 670 FT-IR spectrophotometer as KBr pellets. Solid state $^{13}C$ and $^{31}P$ CPMAS spectra were obtained on Varian NMR Systems 500 MHz spectrometer at 125 and 203 MHz respectively and spinning speeds of 5-10 KHz. $^{13}C$ and $^{31}P$ chemical shifts are reported relative to external tetramethyl silane and phosphoric acid respectively. The $^{31}P$-$^{1}H$ 2D correlation experiment was run using the Lee-Goldberg pulse sequence at a spin rate of 10 KHz and resonance frequencies of 500 and 206 MHz for proton and phosphorus respectively.

Scanning Electron Microscopy/Energy Dispersive X-ray spectroscopy (SEM/EDX) data were obtained on a Hitachi S-4700 Type II. In this technique an electron beam is scanned across a sample's surface and when the electrons strike the sample, X-rays are emitted and detected. The emitted X-ray has an energy characteristic of the parent element. The samples were prepared by spreading a thin layer of the sample particles on an adhesive carbon tape which was stuck to a metal disc and loaded into the analysis chamber. Initially the samples were observed under a low magnification scan. Specific sites on different silica particles of the same sample were chosen at random and analyzed for their elemental compositions. Reported EDX data are average values of element content obtained by examination of composite particles. Elemental analyses (carbon, hydrogen, nitrogen, phosphorus, chloride, sulfur) were conducted by Schwarzkopf Micro-analytical Laboratory, Woodside, N.Y.

Batch capacity experiments were conducted in a Precision Scientific 360 shaker bath (Precision Scientific, Inc., Chicago, Ill.). Dynamic experiments were conducted with a 5 cc column fashioned from a disposable syringe fitted with frits at both ends. Columns were packed dry and the challenge solution was fed by a variable-flow FMI Lab Pump model QG150 (Fluid Metering Inc., Syosset, N.Y.). Metal ion concentrations were determined via a Flame Atomic Absorption (FAA) method using a S2 FAA Spectrometer from SOLAAR, UK and via an Inductively Coupled Plasma/Atomic Emission Spectroscopy (ICP/AES) (Thermo Electron Corp.). The samples that were above the calibration range of the FAA were diluted using a solution mixture of 2%/2% —$HNO_3$/KCl. A nitrous oxide/acetylene flame was used to analyze arsenic and selenium. Samples for the ICP/AES analysis were prepared by filtering to get rid of suspended particles and diluting them (where necessary) with a 5%/5%—HCl/$HNO_3$. The dilutions for FAA and ICP/AES were done in triplicate and standards were analysed after every 10 samples. The standards for arsenic, iron, selenium, and thorium were obtained from Fisher Scientific Co. All values for arsenate, arsenite, selenate and selenite are reported as arsenic and selenium concentrations, respectively. Error bars are included where the error is deemed significant relative to the absolute measurement. The starting composites BP-1 and BP-1M were synthesized by previously published procedures (Hughes, 2007; Rosenberg, 2006; U.S. Pat. No. 7,008,601).

EXAMPLE 2

Synthesis of BPAP and BPAPM (FIG. 2a) by the Mannich Reaction (Moedritzer, 1966)

10 g of BP-1 or BP-1M was mixed with a reagent solution of 30 mL-2N-HCl and 10 g of phosphorus acid ($H_3PO_3$) in a 250 mL flask equipped with an overhead stirrer. The flask was heated to 95° C., and 9 mL of formaldehyde ($CH_2O$) solution (37.7%) was gradually added with stirring. The reaction mixture was heated at 95° C. for 24 h. The flask was cooled and the product was filtered. The resulting composite was washed three times with 40 mL of water, once with 40 mL of 1 M-NaOH, three times with 40 mL of water, once with 40 mL of 1N—$H_2SO_4$, two more times with 40 mL of water, twice with 40 mL of methanol and dried to a constant mass at 65° C. A mass gain of 20 and 22% was obtained starting with BP-1 and BP-1M respectively.

Elemental Analysis: BPAP Made from BP-1: 14.20% C, 3.03% H, 3.36% N, 4.34% P

BPAP made from BP-1M: 12.08% C, 2.99% H, 2.21% N, 5.56% P

IR spectra (KBr pellet): 2650 (m)$cm^{-1}$(vP—OH), 1638 (m)$cm^{-1}$(vN—C), 1250 (s)$cm^{-1}$(vP=O); CPMAS $^{31}P$-NMR: δ6.7; CPMAS $^{13}C$-NMR: δ59.27(N—$CH_2$—P), δ44.90($CH_2$ polymer), δ28.19(Si—$CH_2$), δ-5.23 (Si—Me, for BPAPM only).

EXAMPLE 3

Synthesis of ZrBPAP (FIG. 2b)

10 g of the BPAP composite was mixed with a reagent solution containing 40 mL of 1N—HCl and 4.24 g of $ZrOCl_2 \cdot 8H_2O$. The reaction mixture was stirred at room temperature for 24 h. After 24 h the product was filtered. The resulting composite was washed two times with 50 mL of water, once with 2N—HCl, two more times with 50 mL water, twice with 50 mL methanol and dried to a constant mass at 65° C. The zirconium loading was determined by analyzing the zirconium feed solution and the final zirconium solutions after all the washes were performed. The analysis of zirconium was done via an ICP/AES method. The zirconium loading on BPAP was found to be 1.12 mmol/g which fits well with a mass gain of 17%. Although, zirconyl chloride forms a tetramer $[Zr_4(OH)_8(H_2O)_{16}]^{8+}$ in solution, the immobilized zirconium (IV) is thought to bind to the oxygen atom(s) of two phosphonic acid moieties. This is supported by the data obtained from the elemental analysis, ICP/AES, and SEM/EDX of the composite. Additionally the arsenic to zirconium ratios and their pH dependence seems to best support a picture where two phosphonic acid groups bind one zirconium which in turn binds one arsenate.

Elemental Analysis: ZrBPAP made from BPAPM: 10.1% C, 2.72% H, 1.58% N, 4.80% P, 3.35% Cl A 0.1 g sample of ZrBPAP was washed with 20 mL of 2M sulfuric acid and then rinsed with 20 mL water, washed with 20 mL of acetone and dried to a constant mass at 65° C. The sample was analyzed for sulfur which was taken to be the sulfate equivalent.

Elemental Analysis: 1.64% S; $Zr^{4+}$:$SO_4^{-2}$=2.2:1.

EXAMPLE 4

Synthesis of Iron (III) Loaded BPAP 10 g of the BPAP composite was mixed with a reagent solution containing 50 mL of DI water and 15.1 g of $Fe_2(SO_4)_3 \cdot 4H_2O$. The reaction mixture was stirred at room temperature for 24 h. After 24 h the product was filtered. The resulting composite was washed twice with 50 mL of water each, once with 2M-HCl, two more times with 50 mL water, twice with 50 mL methanol and dried to a constant mass at 65° C. The iron loading was determined by analyzing the iron feed solution and the final iron solutions including all the washes performed. The analysis of iron was done using the flame atomic absorption (FAA). The iron loading on BPAP was found to be 0.98 mmol/g which fits well with a mass gain of 20%.

EXAMPLE 5

Synthesis of Thorium (IV) Loaded BPAP 10 g of the BPAP composite was mixed with a reagent solution containing 50 mL of DI water and 10 g of $Th(NO_3)_4 \cdot xH_2O$. The reaction mixture was stirred at room temperature for 24 h. After 24 h the product was filtered. The resulting composite was washed twice with 50 mL of water each, once with 1M-$H_2SO_4$, two more times with 50 mL water, twice with 50 mL acetone and dried to a constant mass at 65° C. The thorium loading was determined by analyzing the thorium feed solution and the final thorium solutions including all the washes performed. The analysis of thorium was done using the ICP/AES method. The thorium loading on BPAP was found to be 0.60 mmol/g which fits well with a mass gain of 30%.

EXAMPLE 6 pH Profiles pH profiles were performed on arsenite, arsenate, selenite and selenate via equilibrium batch tests. The pH of the challenge solutions was adjusted with hydrochloric acid. Arsenic and selenium concentrations in challenge solutions were 1.0 g/L. Batch equilibrium tests were conducted by adding 0.2 g of phosphonic acid modified composite (ZrBPAP) to 20 mL of the corresponding arsenic solution at the selected pH values. To ensure full equilibration, the arsenic solution and BPAP mixtures were placed in a 360° shaker. After 24 hrs the mixtures were removed from the shaker and allowed to settle. Each supernatant was extracted and diluted as necessary with a nitric acid/KCl solution (2%/2%) for analysis using FAA.

EXAMPLE 7

Anion Selectivity with FeBPAP and ThBPAP

FeBPAP and ThBPAP were equilibrated with 10 mL of solutions containing 200 mg/L each of arsenate and selenate at pH 6 for 24 h. The solutions were then analyzed according to the batch procedures outlined above. The FeBPAP loaded 20 mg/g of arsenate and 9 mg/g of selenate. The ThBPAP loaded 19 mg/g arsenate and 5 mg/g of selenate. The arsenate/selenate ratio for FeBPAP is 2.2:1 and for ThBPAP it is 4:1.

EXAMPLE 8

Concentration Dependent Isotherms

The Langmuir adsorption model was applied to arsenic binding on ZrBPAP. Isotherms were obtained using batch experiments as described in the previous experimental section. Only arsenate was investigated at pH 4 and 6. The arsenate concentration was varied, with the pH being held constant (pH 4 or 6), and each sample was shaken for 48 hrs to ensure complete equilibration. Langmuir parameters were obtained from the appropriate linear regressions for As(V).

EXAMPLE 9

Dynamic Adsorption and Elution Studies

Arsenic and selenium breakthrough experiments and subsequent stripping were carried out by packing a 5 mL column with ZrBPAP (~2.7 g). The composite was packed using Frits at both ends and challenge solutions were run through the column using a variable flow pump. The flow rate was held constant at 1 mL/min (0.2 column volume/min). Each column of ZrBPAP was conditioned as follows: 20 mL water, 50 mL 2M-$H_2SO_4$ and 50 mL water, 250 mL of arsenic challenge solutions (1-3 g/L) were run through the column. Columns were then rinsed with 20 mL water, eluted with 100 mL 2 M-$H_2SO_4$ and finally rinsed with 20 mL of water. The rinse water used in all the cases was deionized water. Eluent fractions were collected in 10 mL aliquots beginning with the first 10 mL of challenge solution. The fractions were preserved with $HNO_3$ (conc.) and analyzed by FAA and/or ICP/AES.

EXAMPLE 10

Longevity Studies

Experiments for testing the longevity and lifeline of the composite were done in a similar fashion as that for dynamic adsorption studies. However, the longevity testing was done in an automatic setup using a 10 mL column with an internal diameter of 0.78 cm and a flow rate of 1 mL/min at pH 6. The automatic setup is a four way solenoid switch where the flow solutions are switched in the order—rinse>feed>rinse>acid strip>rinse (FIG. S3). This cycle was run 1000 times to test for the lifeline of the composite. ZrBPAP was packed tightly using frits at both the ends and the arsenate feed concentration used was 1.0 g/L. The acid used for the strip was 2M-$H_2SO_4$ and de-ionized water was used for all the rinses. After the $100^{th}$ and the $1001^{st}$ cycles the column was removed from the automatic setup and was tested for capacity by the dynamic breakthrough test described above. There was a 14% decrease in capacity over the course of the 1000 cycles.

EXAMPLE 11

Characterization of BPAP and BPAPM

Infrared and solid state NMR data are consistent with the proposed composite formulations BPAP and BPAPM (see experimental section). Elemental analysis of BPAP and BPAPM shows lower carbon and nitrogen content in BPAPM but slightly higher phosphorus content. The lower carbon content is due to the use of methyl trichlorosilane in a 7.5:1 ratio with chloropropyl trichlorosilane. The lower nitrogen content suggests slightly lower polymer loading but the higher phosphorus content suggests that more of the amines in the polymer were available for modification. This is consistent with previous results on ligand modified SPCs made with mixed silanes. In Table 1 the percent composition data are converted to mmol/g and mole ratios. These ratios give some further insight into the functionalization of these materials. That the N/P ratio is 0.88 while the N content is 1.5 mmol/g indicates that some of the amines may be doubly substituted with phosphonic acid groups (FIG. 2a). As expected the C/N and C/H ratios decreased after Zr(IV) loading. The Zr/P ratio of was determined by SEM/EDX as well as from metal loading data and elemental analysis and gave reasonably consistent values of 0.69 and 0.72 respectively. This indicates that more than one the phosphonic acid group is coordinated to a zirconium ion. Consistent with this is that chloride analysis gives a Zr/Cl ratio of 1.1:1 indicating the Zr sites have net charge of +1. After washing the ZrBPAP with 2M-$H_2SO_4$, elemental analysis gives a Zr/S ratio of 2.1:1 further corroborating the net charge of +1 on the Zr sites. Given that each phosphonic acid group has a maximum charge of −2 there must be more than one of these groups coordinated to each Zr (FIG. 2b) as the Zr/P ratios suggest.

TABLE 1

Elemental Analysis Data and Ligand Loading for BP-1 and the Corresponding Phosphorus Acid Modified BPAP and ZrBPAP[a]

| | C (mmol/g) | H (mmol/g) | N (mmol/g) | P (mmol/g) | N/P | Zr/P |
|---|---|---|---|---|---|---|
| BP-1 | 9.57 | 21.4 | 2.09 | — | — | — |
| BPAP | 10.1 | 29.9 | 1.58 | 1.79 | 0.88 | — |
| Zr-BPAP | 8.42 | 27.2 | 1.13 | 1.55 | 0.73 | 0.72[b] (0.69)[c] |

[a]Error in elemental analysis is ±0.3%.
[b]Based on elemental analysis and ICP data.
[c]Based on SIM/EDX data.

Figure 3:
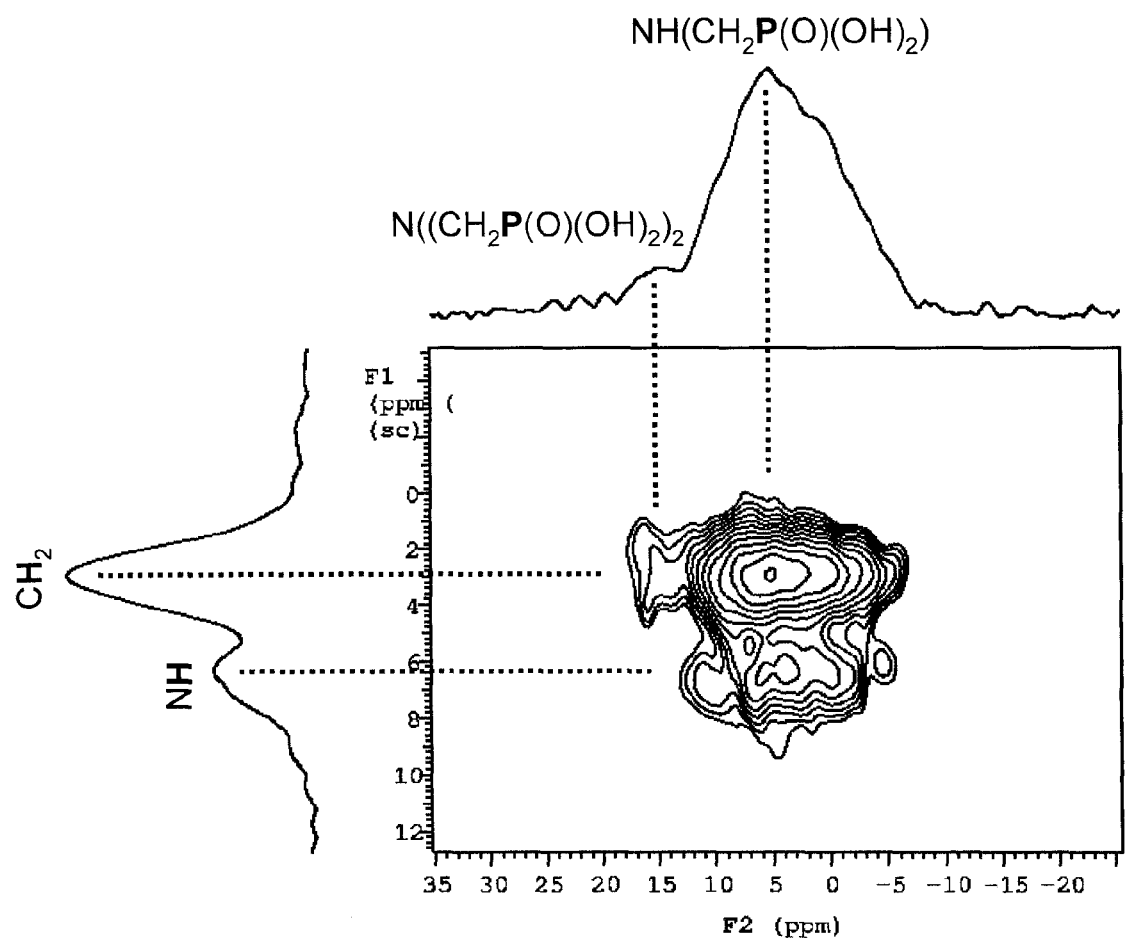
FIG. 3 is a solid-state CPMAS $^1$H-$^{31}$P HETCOR NMR spectrum of BPAP.

Because the N/P ratios suggest that some of the amines may be doubly substituted with phosphonic acid groups, a solid state 2D phosphorus-proton correlation experiment was conducted. The 1D $^{31}P$ CPMAS spectra of BPAP consistently showed a small shoulder downfield of main resonance at 6.7 ppm. The 2D correlation spectrum shows the expected overlapping cross peaks for the NH proton (at 6.0 ppm, obtained from solution data on model compounds) and the $CH_2$ protons (at 3.5 ppm) with the main phosphorus resonance (FIG. 3). Significantly, the small shoulder in the $^{31}P$ NMR spectrum shows the expected $CH_2$ correlation but the NH correlation is absent. Although the contour maps have not bee qualified due to overlap of the NH and $CH_2$ correlations these data clearly indicate that a significant fraction of the amine groups are doubly substituted with $CH_2PO(OH)_2$ groups.

EXAMPLE 12

Equilibrium Batch Tests

Equilibrium batch tests were performed to evaluate the ability of ZrBPAP to adsorb arsenate and arsenite in the pH ranges of 2-8 and 2-10 respectively. Solutions (20 mL) of arsenate and arsenite containing 1000 ppm arsenic were shaken with 0.2 g of the composite for 24 hrs. The batch capacities for both the arsenic species are shown in Table 2.

TABLE 2

Arsenic (III and V) Batch Capacites Tesrted at Various pH on ZrBPAP[a]

| species | pH 2 | pH 4 | pH 6 | pH 8 | pH 10 |
|---|---|---|---|---|---|
| As (III), mg/g (mmol/g) | 1 (0.01) | 2 (0.03) | 2 (0.03) | 6 (0.08) | 50 (0.67) |
| As (V), mg/g (mmol/g) | 51 (0.68) | 81 (1.08) | 56 (0.75) | 40 (0.53) | — |

[a]Numbers in parentheses are the batch capacities values in mmol As/g.

Maximum arsenate capacity occurs at pH 4, where the predominant species is $H_2AsO_4^{-1}$ (>95%) and decreases sharply at pH 8, where the predominant species is $HAsO_4^{-2}$. At pH 6, only 80% of the arsenate exists as $H_2AsO_4^{-1}$ and the remaining 20% exists as $HAsO_4^{-2}$. This explains the small drop in arsenate capacity from pH 4 to pH 6. The arsenate capacity at pH 2 is still significant (0.68 mmol/g). At this pH, $H_3AsO_4$ is the main species in solution (approximately 65%). However the remaining 35% exists as $H_2AsO_4^{-1}$ and it is possible that there is a rapid displacement of the $H_3AsO_4/H_2AsO_4^{-1}$ equilibrium. The decrease in arsenate capacities with increasing pH could be due to the high affinity of zirconium (IV) for the hydroxide ion. In contrast, arsenite exists predominantly as $H_3AsO_3$ till pH 8. It is only at pH 10, that the predominant species is $H_2AsO_3^{-1}$, where maximum arsenite capacity is observed.

Figure 2C:
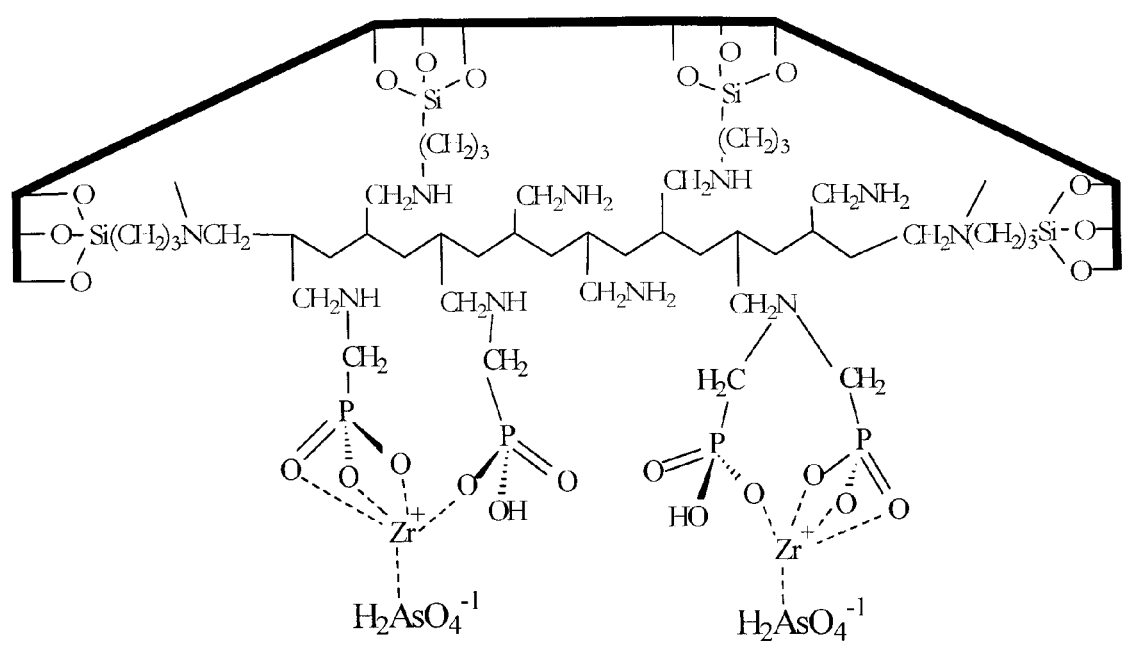
FIG. 2C is a schematic representation of ZrBPAP loaded with arsenate.

The ratio of Zr/As at pH 4 and 6 were estimated using SEM/EDX (approximate area analysed was 10 μm×10 μm) which allowed to determine the Zr/P, As/P, and As/Zr ratios at the pHs mentioned above. At pH 4, Zr/P=0.72±0.01, As/P=0.87±0.01, As/Zr=1.2±0.01, indicating that there is about one Zr(IV) for each $H_2AsO_{04}^{-1}$ (FIG. 2c). At pH 6 where $HAsO_4^{-2}$ becomes a major species, these ratios change to Zr/P=0.71±0.01, As/P=0.59±0.01, As/Zr=0.8±0.01, respectively indicating that at a significant number of sites two Zr(IV) are required to bind each $HAsO_4^{-2}$. These data are also in agreement with the net +1 charge on each Zr site.

EXAMPLE 13

Langmuir Adsorption Isotherms

The Langmuir sorption model determines the relationship between the concentrations of surface adsorbed species to the number of active sites on that surface at equilibrium. If an adsorption process follows this model then it can be concluded that adsorption takes place as a monolayer on a homogenous surface without interactions between the adsorbed species. The rearranged-linear version of the Langmuir equation is shown in Equation 2.

$$C_e/Q_e = 1/Q_m K_{ads} + C_e/Q_m \quad (2)$$

where, $C_e$ represents the concentration of metal ions in solution at equilibrium (mg/L);
$Q_e$ is the concentration of metal ions adsorbed onto the composite (mg/g);
$Q_m$ is the measure of the maximum capacity of the adsorbent (mg/g);
$K_{ads}$ is the intensity of adsorption (L/g).
$Q_m$ can be calculated from the slope of the straight line plot of $C_e/Q_e$ vs. $C_e$. The constant $K_{ads}$ can be derived from the slope and the intercept of the same straight line ($1/Q_m K_{ads}$). If the plot of Equation 2 is linear then $Q_m$ provides an estimate of the active sites and $K_{ads}$ gives an estimate of the driving force or the equilibrium constant for the process.

Figure 4:
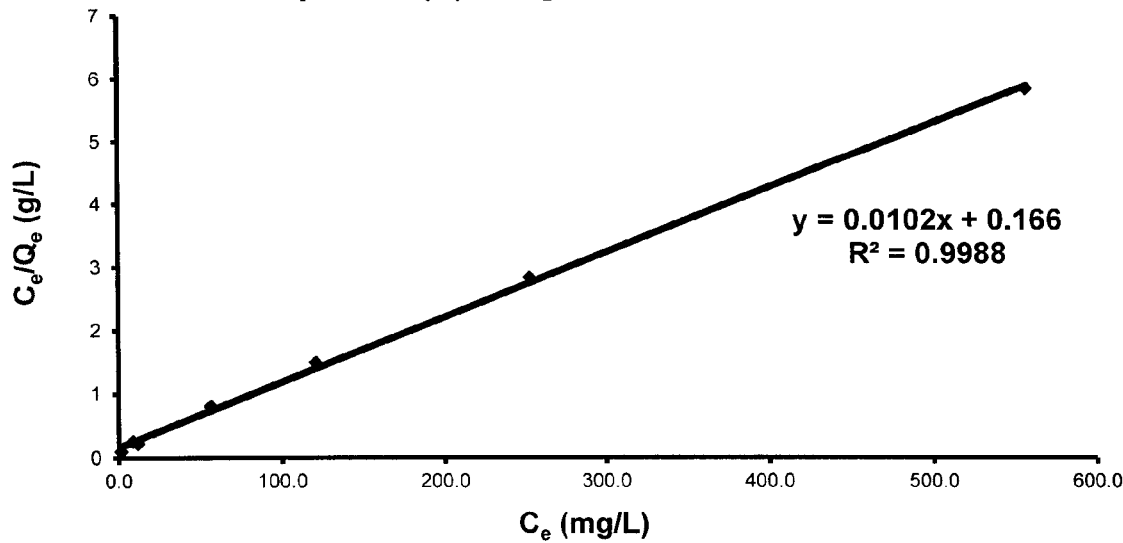
FIG. 4 is Langmuir adsorption isotherm for arsenate adsorption by ZrBPAP at pH 4 (top) and pH 6 (bottom).
Figure 4:
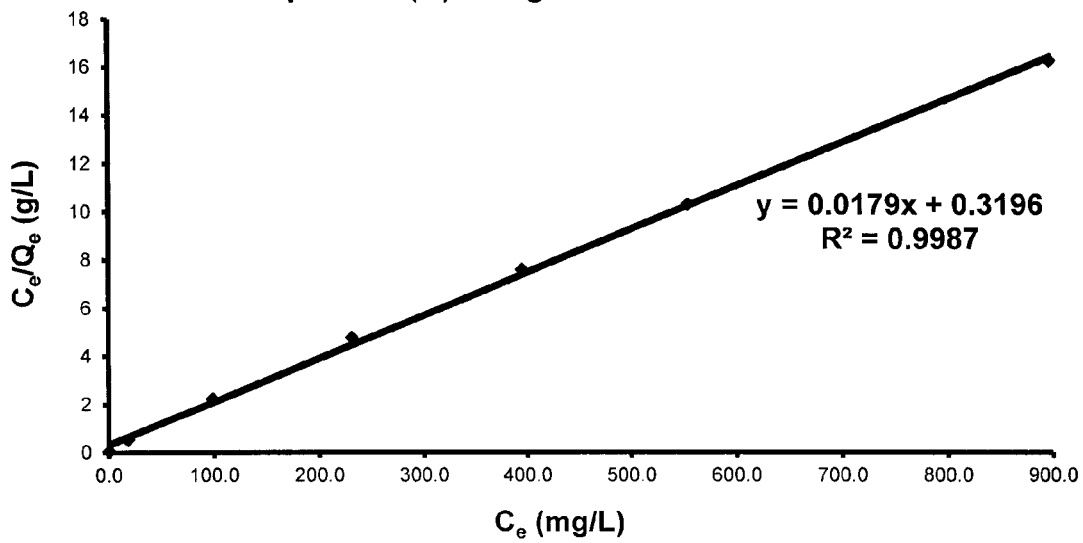

Langmuir concentration dependent isotherms for arsenic on ZrBPAP at pH 4 and 6 are reported in FIG. 4. The Langmuir model fits the sorption of arsenate by ZrBPAP very well; $R^2$=0.9988 and 0.9987 for pH 4 and 6 respectively. Moreover, the model provides information regarding the intensity of the sorption process ($K_{ads}$) as well as an approximation of the theoretical number of sorption sites on the surface ($Q_m$). The value of $K_{ads}$ for ZrBPAP is 0.016 L/g and the value of $Q_m$ is 98 mg/g at pH 4. At pH 6 the $K_{ads}$ is 0.018 L/g and $Q_m$ is significantly smaller being 55 mg/g. This is consistent with the observed batch and dynamic capacities and with the SEM/EDX data. The values of $K_{ads}$ and $Q_m$ for anion binding reported here are similar to the values obtained for cation binding by silica polyamine composites ($K_{ads}$=0.012L/g and $Q_m$=21-44 mg/g for $Ni^{2+}$ cations with an EDTA ligand on silica polyamine composite) (Zagorodni, 2002).

EXAMPLE 14

Dynamic Column Breakthrough and Elution Studies

Batch capacity measurements provide only equilibrium adsorption properties of ZrBPAP. In order to obtain an understanding of the mass transfer kinetics and ease of regeneration of this new arsenate adsorption material breakthrough tests were run at pHs of 2, 4, 6, and 8 for arsenate (See FIG. S2 in supplementary materials). The arsenate dynamic capacity increases from pH 2 to pH 4. It is highest (1.15 mmol/g) at pH 4 and gradually deceases as the pH increases. More importantly, the saturation flow capacities are very close to the equilibrium batch capacities (Table 2) indicating excellent mass transfer kinetics typical of these type of silica polyamine composites (Beatty, 1999; Hughes, 2007).

In the case of arsenite, breakthrough tests run from pH 2-10 showed that there was no significant adsorption of arsenite until pH 10 where ionization of $As(OH)_3$ is significant (see FIGS. S1 and S2 in supplementary materials), again in agreement with batch capacity profiles. This indicates that ZrBPAP will not be a useful material for arsenite capture in the pH range of natural waters (6-8) and most mining waste streams.

EXAMPLE 15

Multiple Load—Strip Cycling and Regeneration Efficiency

Figure 5A:
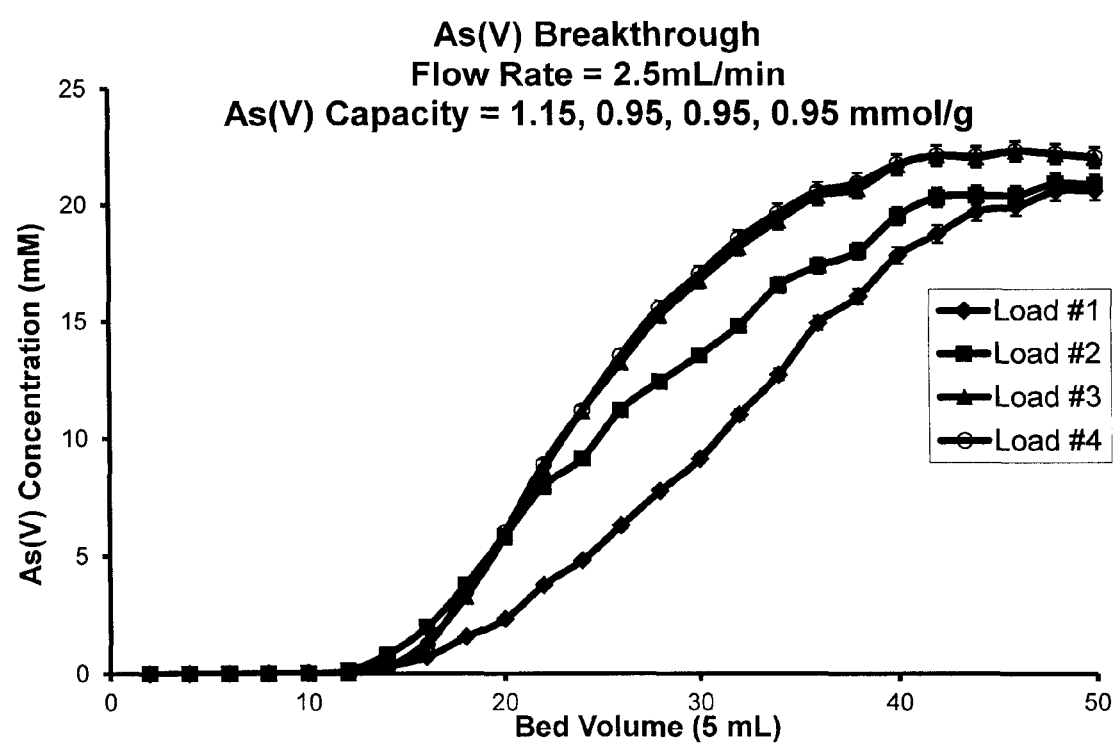
FIG. 5A is a breakthrough profile for four consecutive load cycles of ZrBPAP with 1650 mg/L of arsenate at pH 4. 5 mL columns were run at the flow rates indicated.
Figure 5B:
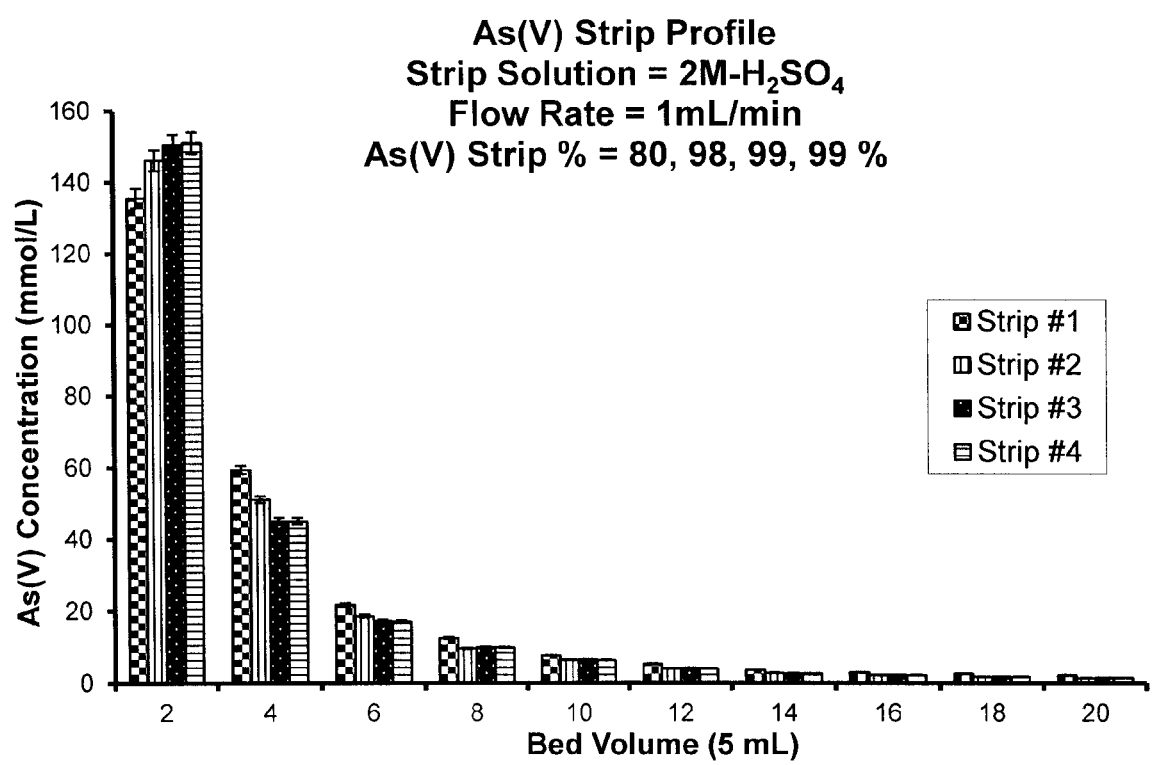
FIG. 5B is a strip profile for four consecutive load cycles of ZrBPAP with 2 M $H_2SO_4$. 5 mL columns were run at the flow rates indicated.

In order for ZrBPAP to be a useful material for arsenic removal and recovery, it must be reusable and capable of regeneration with economically viable methodologies. Four consecutive load and strip cycles were performed on a 5 mL column containing ZrBPAP (2.7 g) with an arsenate feed concentration of approximately 22 mM (1650 mg/L) at pH 4. The arsenate capacities for the four consecutive cycles were 1.15, 0.95, 0.95, 0.95 mmol/g—dry composite respectively (FIG. 5a). The decrease in capacity between the first load and subsequent loads was due to the presence of adsorptive sites inaccessible to the strip solution leading to the incomplete stripping and recovery of the arsenate anion from the first strip cycle using $2M-H_2SO_4$ (FIG. 5b). The total arsenate feed captured by the column for each of the four cycles was 3.09 mmol (232 mg), and 2.56 mmol (192 mg), 2.56 mmol (192 mg), and 2.55 mmol (191 mg) respectively. The arsenate strips for the four cycles were 186 mg (80%), 188 mg (98%), 190 mg (99%), and 190 mg (99%), respectively. However, the arsenate capacities for the second, third and the fourth cycles remain the same, indicating that no more zirconium sites are blocked by the unrecoverable arsenate ions. The first 2 column volumes of the acid strip contain arsenic at ~150 mM, representing a concentration factor of 6.8 with respect to the feed. Although it took 20 column volumes to strip all the arsenate from the column, 86% or more came off in the first 4 column volumes.

Figure 6:
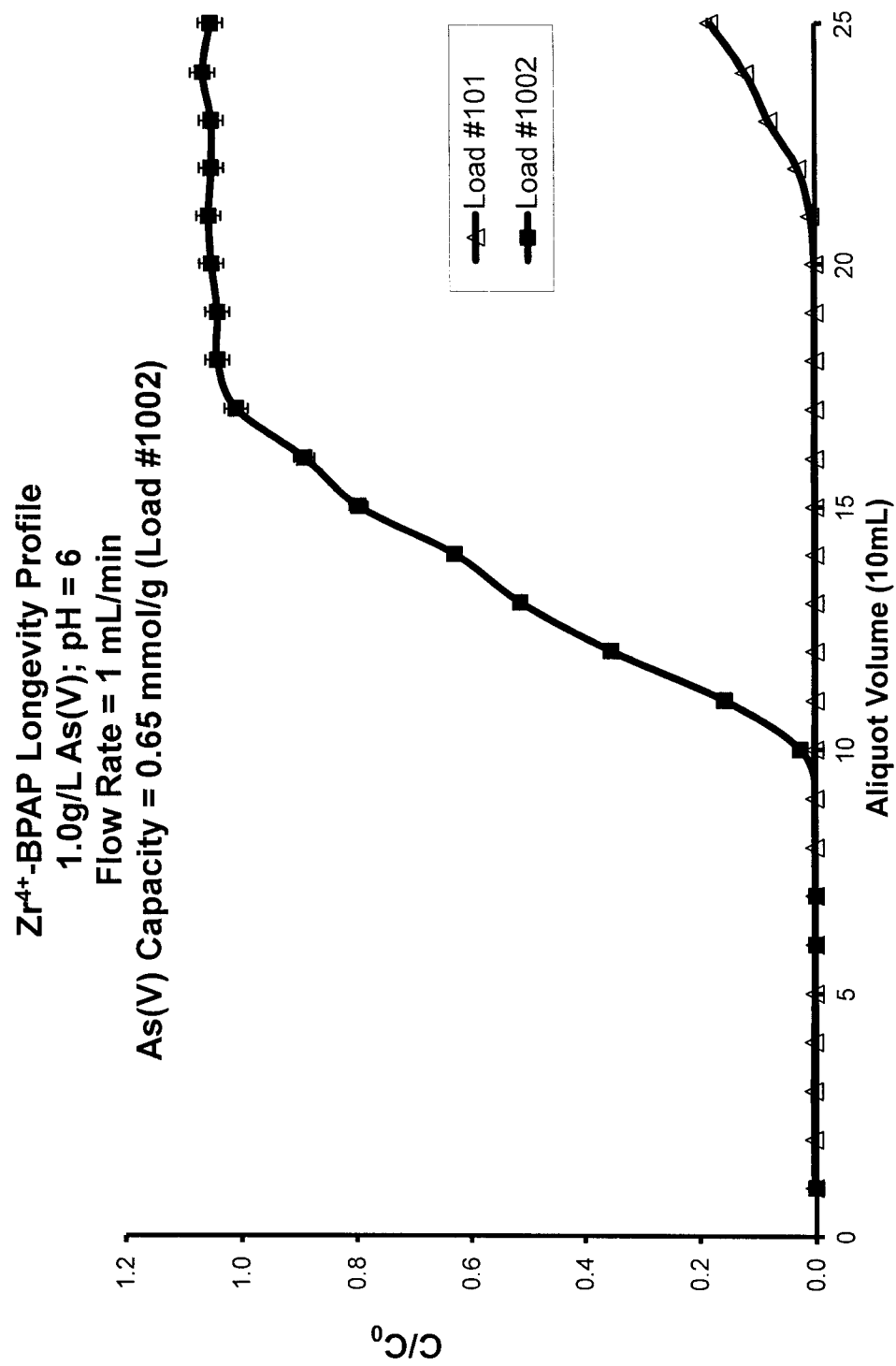
FIG. 6 is ZrBPAP longevity profile over for arsenate anion 1000 cycles.

One thousand load and strip cycles were run on the composite using a computer controlled multi-solenoid apparatus described above. Column capacity was measured after the $100^{th}$ and $1001^{st}$ cycle using the standard breakthrough procedures (FIG. 6). Tests were run at pH 6 using a 1.0 g/L arsenate solution. The capacity for load #1002 was measured to be 0.65 mmol/g; a reduction in arsenate capacity of about 14% as compared to the capacity reported in Table 2 for pH 6. This represents an excellent usable lifeline for the lifetime of this composite. Also notable is the distinct improvement in capture kinetics as measured by the better column utilization factor of 0.6 vs. 0.22 that can be seen by comparing FIGS. 5a and 6, respectively. The column utilization factor is calculated using the equation given below (Zagorodni, 2007):

$$U = \frac{(BV \text{ at initial breakthrough})}{(BV \text{ at complete breakthrough})} = \frac{V_{MCL}}{V_C} = \frac{100 \text{ mL}}{170 \text{ mL}} = 0.6 \quad (3)$$

where, U—Column utilization factor,
BV—Bed volume,
$V_{MCL}$—Volume at maximum contaminant level (MCL),
$V_C$—Volume at complete breakthrough.
This seems to be a general characteristic of these composites and suggests that on repeated use, minor impurities such as siloxy-alkyl oligomers that might be introduced during synthesis are cleaned out of the pores of the composite allowing more diffusion in and out of the pores.

EXAMPLE 16

ZrBPAP Selectivity Over Other Anions

Figure 7:
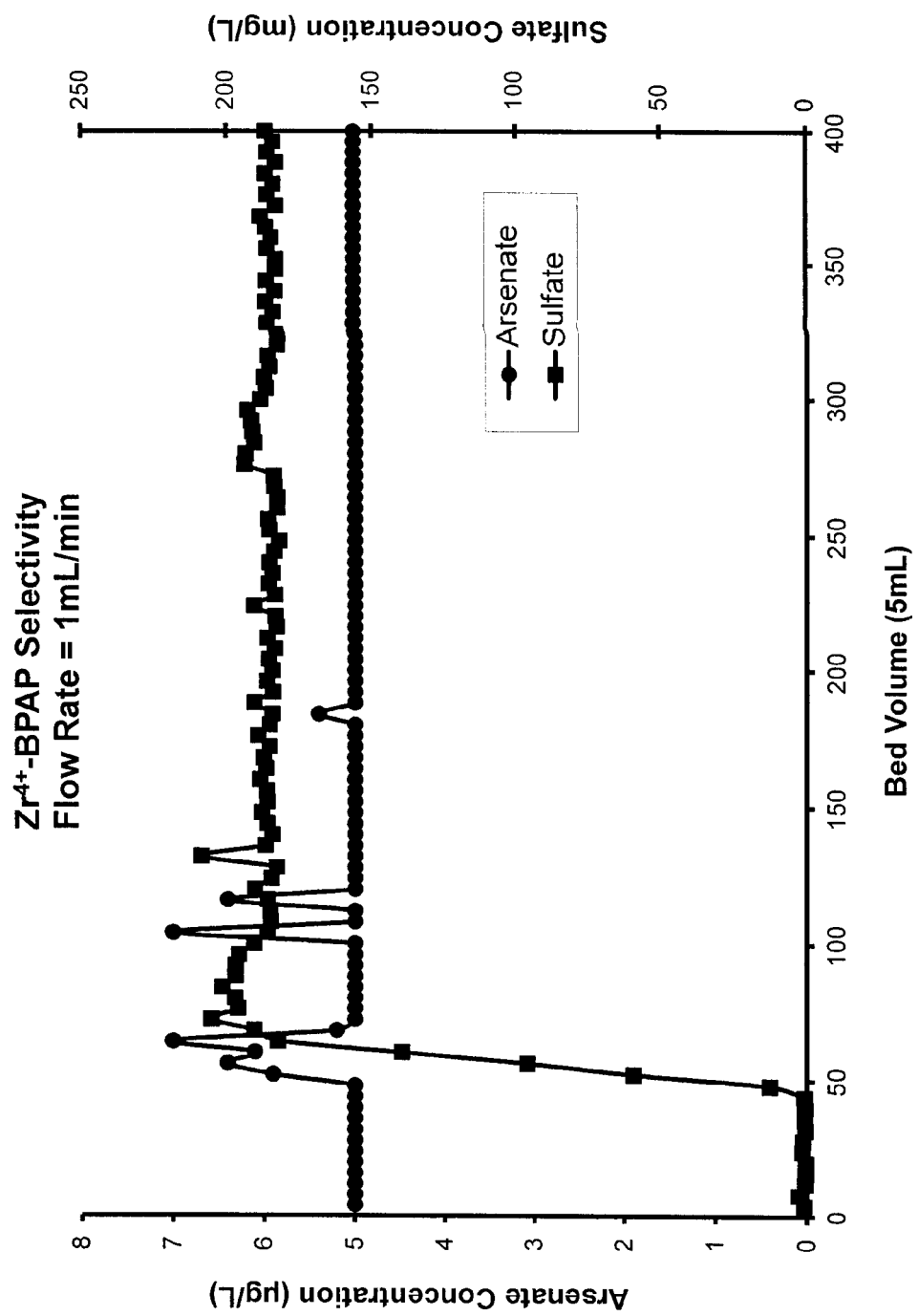
FIG. 7 is a breakthrough curve ZrBPAP selectivity for low level arsenate over excess sulfate.

The high sorption of any media can decrease significantly in the presence of competing ions. Sulfate is commonly present in groundwater with a concentration exceeding that of arsenic by several orders of magnitude. Ion exchange resins have not been recommended for As (V) when the sulfate concentration exceeds 120 mg/L (Ghurye, 1999). The selectivity of ZrBPAP for arsenate in the presence of excess sulfate and chloride ions was therefore investigated. Typical mine waste solution contain arsenic in the range 150-300 μg/L with sulfate present in about a 1000 fold excess. The solution used for evaluating selectivity contained 238 μg/L—arsenate & 200 mg/L—sulfate at pH 6. A two liter solution, corresponding to 400 bed volumes was run through a 5 cc column packed tightly with ZrBPAP (2.6 g). After only 60 bed volumes it was observed that sulfate reached full breakthrough while the arsenate ion was still being captured on the composite (FIG. 7). Since the detection limit for the Thermo Electron ICP/AES was 5 μg/L for arsenic, concentrations reported below that level by the instrument was assumed to be 5 μg/L. Even after 400 bed volumes, the arsenic concentration was below EPA's Maximum Contaminant Level (MCL) of 10 µg/L. The intermittent spikes observed for the arsenate anion could be due to some column channeling or dilution errors. The selectivity factor for arsenate over sulfate was calculated at full sulfate breakthrough (60 bed volumes) using the relation in Equation 4:

$$\frac{[As]_F/[SO_4]_F}{[As]_{60}/[SO_4]_{60}} = 50:1 \qquad (4)$$

Figure 8:
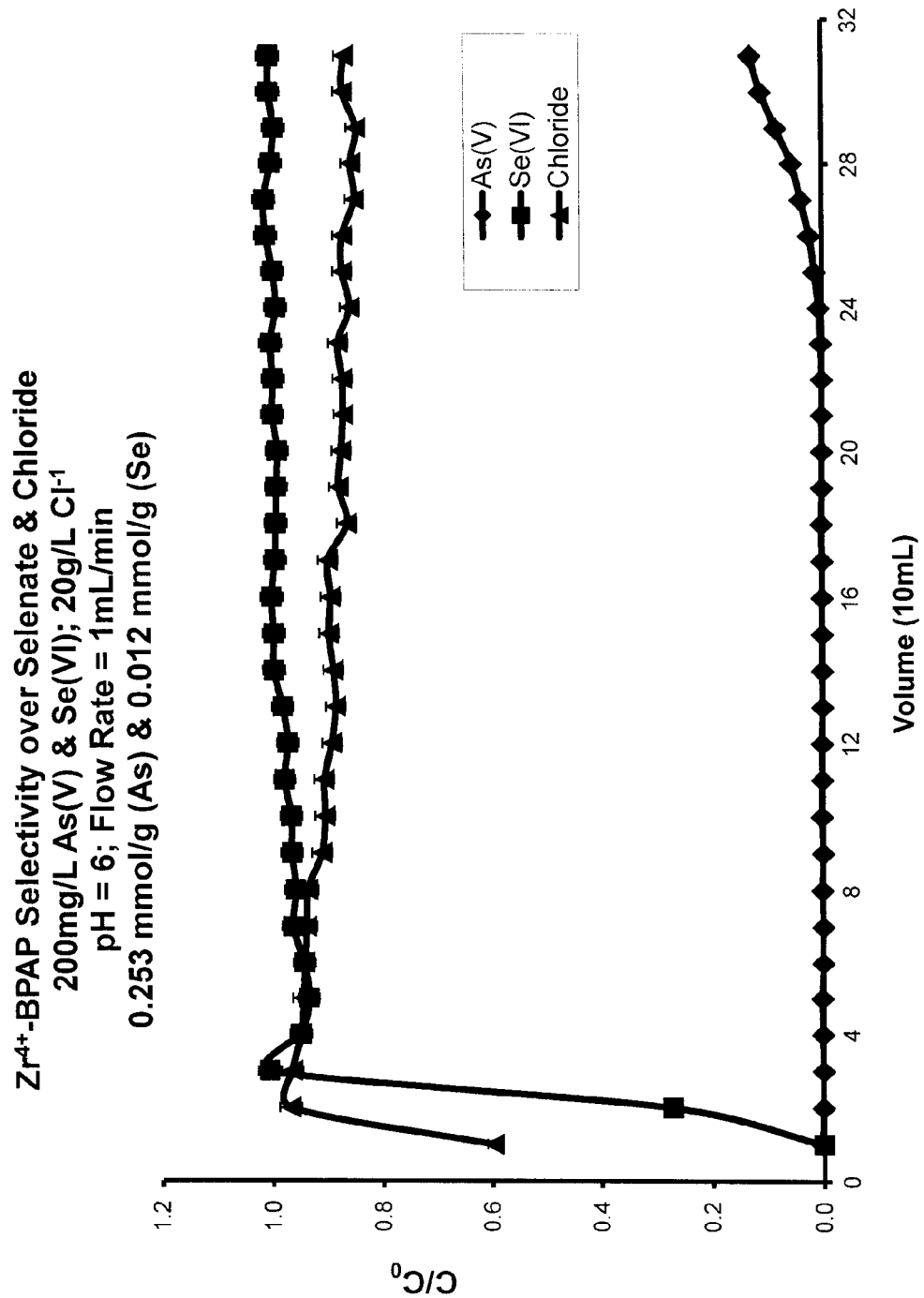
FIG. 8 is a breakthrough curve for a solution containing 200 mg/L arsenate, 200 mg/L selenate, and 20 g/L chloride at pH 6.

To further test the selectivity of ZrBPAP for arsenate ion, a solution of approximately 200 mg/L each of arsenate and selenate in presence of approximately 20 g/L of chloride ion (as NaCl) was made. Solutions of this type model the high chloride solutions that result from hypochlorite oxidations of industrial waste streams. Equilibrium batch tests and pH profiles show the selective capture of arsenate over selenate, and chloride, although the capacities for arsenate over a wide pH range of 2-11, remained the same (0.25 mmol/g). These batch tests show that arsenate capacities are lower in presence of competing ions (0.25 mmol/g) than that reported earlier in the absence of competing ions (0.75 mmol/g) such as sulfate and chloride. A breakthrough test on the same solution was carried out at pH 6, and 60 bed volumes was run through a column packed with ZrBPAP at a flow rate of 1 mL/min. As shown in FIG. 8, the selenate ion reaches full breakthrough almost immediately (within 4 bed volumes) and the arsenate did not reach complete breakthrough even after 60 bed volumes. From this data, it is estimated the ZrBPAP selectivity factor for arsenate over selenate to be about 20:1. Equilibrium batch studies on the affinity of ZrBPAP for selenite and selenate found that this material has a higher affinity for selenite than for selenate, the batch capacities at pH=6 being 64 and 39 mg/g respectively. These results are qualitatively similar to those obtained with iron based adsorbents where selenite is preferred over selenite (Manning, 1995). The selectivity of arsenate over selenite was measured using a breakthrough study and found that the selectivity of arsenate over selenite was lower than for selenate being approximately 4:1 rather than 20:1. This is consistent with the equilibrium batch studies. This difference is undoubtedly due to the lower charge on selenite at pH=6.

The observed selectivity for arsenate over sulfate, selenate and chloride at pH 6 is clearly due to more than simple electrostatic interactions. At pH 6 arsenate exists as a mixture of $H_2AsO_4^{1-}$ and $HAsO_4^{2-}$ ($pKa_1=2.19$ and $pKa_2=6.94$) while both sulfate and selenate exist as fully deprotonated dianions ($pKa_1=<0.0$ and $pKa_2=1.97$ and $pKa_1=<0.0$ and $pKa_2=1.92$ for selenate and sulfate respectively). Arsenate has a less electronegative element as the central atom as compared to selenate (2.2 versus 2.6, for both sulfate and selenate according to the Pauling scale). This results in a more polarizable oxoanion which can form polar-covalent interactions with the phosphonic acid —Zr (IV) sites and these are clearly stronger than electrostatic interactions based on anion charge. In the case of the hypochlorite oxidation solution tested here the chloride is co-loading with arsenate, and based on the reduced arsenic capacities it is important to note that the monoanion chloride is selected over the dianion selenate. Again, this probably points to the stronger polar covalent interactions with the phosphonic acid—Zr(IV) centers for chloride relative to selenate but not arsenate. The observed co-loading of chloride with arsenate is due the huge excess of chloride present in the solution.

In order to understand the impact of the charge and size of the immobilized metal on the arsenate/selenate selectivity samples of FeBPAP and ThBPAP were prepared. Ferric loading on BPAP was 0.98 mmol/g giving a Fe/P ratio of 0.63 and suggesting that like Zr(IV), more than one phosphonic acid group is bound to each ferric ion. In the case of Th(TV), a loading 0.60 mmol/g was realized which gives a Th/P ratio of 0.4 and suggesting even higher coordination of the phosphonic acid groups to this larger metal ion. On equilibrating FeBPAP with a solution containing 200 mg/L each of arsenate and selenate at pH 6, it was realized a 2.2:1 arsenate/selenate adsorption ratio. For ThBPAP the same experiment gave a 4:1 adsorption ratio. Thus both a larger metal with the same charge and a metal of similar size but with a lower charge gave lower arsenate/selenate selectivity. These results suggest that both charge and size impact selectivity and that there must be a specific match between ligand coordination, metal charge and anion polarizability in order to obtain optimal selectivity.

It should be understood that the examples and embodiments described herein are for illustrative purposes only and that various modifications or changes in light thereof will be suggested to persons skilled in the art and are to be included within the spirit and purview of this application and the scope of the appended claims.

REFERENCES

Anderson, C.; Rosenberg, E.; Hart, C. K.; Ratz, L.; Cao, Y. Single Step Separation and Recovery of Palladium Using Nitrogen Species Catalyzed Pressure Leaching and Silica Polyamine Composites. *Proceedings of the 5th International Symposium on Hydrometallurgy,* 2003, Volume 1—Leaching and Purification, Ed. Courtney Young, TMS, Warendale, Pa., p 393.

Balaji, T.; Matsunaga, H. Adsorption Characteristics of As(III) and As(V) with Titanium Dioxide Loaded Amberlite XAD-7 Resin. *Analytical Science,* 2002, 18, 1345-1349.

Balaji, T.; Yokoyama, T.; Matsunaga, H. Adsorption and Removal of As(V) and As(III) using Zr-loaded Lysine Diacetic Acid Chelating Resin. *Chemosphere,* 2005, 59, 1169-1174.

Beatty, S. T.; Fischer, R. J.; Hagars, D. L.; Rosenberg, E. A comparative Study of the Removal of Heavy Metal Ions from Water using a Silica Polyamine Composite and a Polystyrene Chelator Resin. *Ind. Eng. Chem. Res.,* 1999, 38(11), 4402-4408.

Cheng, R. C.; Wang, H.; Beuhler, M. D. Enhanced Coagulation of Arsenic Removal. *J. Am. Water Works Assoc.,* 1994, 86, 79-90.

Fish, R. H.; Tannous, R. S. Polymer-Pendent Ligand Chemistry 1. Reactions of Organoarsenic Acids and Arsenic Acid with Catechol Ligands Bonded to Polystyrene-Divinyl Benzene. *Inorg Chem.,* 1985, 24, 4456-4458.

Ghosh, A.; Mukiibi, M.; Ela, W. TCLP Underestimates Leaching of Arsenic from Solid Residuals under Landfill Conditions. *Environmental Science and Technology,* 2004, 38(17), 4677-4682.

Ghurye, G. L.; Clifford, D. A., Tripp, A. R. "Combined Arsenic and Nitrate Removal by Ion Exchange", *J. Am. Water Works Assoc.,* 1999, 91(10), 85-96.

Hughes, M.; Rosenberg, E. "Characterization and Applications of Poly-acetate Modified Silica Polyamine Composites. *Sep. Sci. Tech.,* 2007, 42, 261-283.

Kailasam, V.; Rosenberg, E.; Nielsen, D., Characterization of Surface-Bound Zr(IV) and Its Application to Removal of As(v) and As(III) from Aqueous Systems Using Phosphonic Acid Modified Nanoporous Silica Polyamine Composites, *Ind. Eng. Chem. Res.* 2009, 48, 3991-4001.

Kaltreider, R. C.; Davis, A. M.; Larivierre, J. P.; Hamilton, J. W. Arsenic Alters the Function of the Glucocortocoid Receptor as a Transcription Factor. *Environ. Health Persp.,* 2001, 109(3), 245-251.

Kramer, J.; Driessen, W. L.; Koch, K. R.; Reedijk J. Highly Selective and Efficient Recovery of Pd, Pt and Rh from Precious Metal-Containing Industrial Effluents with Silica based (Poly)amine Ion Exchangers. *Sep. Sci. and Tech.,* 2004, 39, 63-75.

Li, Z.; Mou, S.; Ni, Z.; Riviello, J. M. Sequential Determination of Arsenite and Arsenate by Ion Chromatography. *Anal. Chim. Acta.,* 1995, 307, 79-87.

Mandal, B. K.; Suzuki, K. T. Arsenic Round the World: a Review. *Talanta,* 2002, 58(1), 201-235.

Manna, B.; Dasgupta, M.; Ghosh, U. C. Crystalline hydrous Titanium (IV) Oxide (CHTO): An Arsenic (III) Scavenger from natural Water. *J. Water Supply: Res. & Tech.—AQUA,* 2004, 53(7), 483-495.

Manning, B. A.; Burau, A. G. Selenium Immobilization in Evaporation Pond Sediments by in situ Precipitation of Ferric Oxyhyroxide. *Env. Sci. and Tech.,* 1995, 29, 2639.

McNeill, L. S.; Edwards, M. Soluble Arsenic Removal at Water Treatment Plants. *J. Am. Water Works Assoc.,* 1995, 87(4), 105-113.

Meng, X.; Korfiatis, G. P.; Jing, C.; Christodoulatos, C. Redox Transformations of Arsenic and Iron in Water Treatment Sludge During Aging and TCLP Extraction. *Environmental Science & Technology,* 2001, 35(17), 3476-81.

Moedritzer, K.; Irani, R. R. The Direct Synthesis of α-Aminomethylphosphonic Acids. Mannich-Type Reactions with Orthophosphorus Acid. *Journal of Organic Chemistry,* 1966, 31(5), 1603-1607.

Moller, T.; Sylvester, P. Effect of Silica and pH on Arsenic Uptake by Resin/Iron Oxide Hybrid Media. *Water Research,* 2008, 42(6-7), 1760-1766.

Munoz, J. A.; Gonzalo, A.; Valiente, M. Kinetic and Dynamic Aspects of Arsenic Adsorption by Fe(III)-Loaded Sponge. *J. Solution Chem.,* 2008, 37(4), 553-565.

Ramana, A.; Sengupta, A. K. Removing Selenium(IV) and Arsenic(V) Oxyanions with Tailored Chelating Polymers. *J. Environ. Eng.,* 1992, 118,755-775.

Rau, I.; Meghea, A.; Peleanu, I.; Gonzalo, A.; Valiente, M.; Zaharescu, M. Modelling the Arsenic (V) and (III) Adsorption. *Czechoslovak Journal of Physics,* 2003, 53(A-2), 549-556.

Rosenberg, E.; Hart, C.; Hughes, M.; Kailasam, V.; Allen, J.; Wood, J.; Cross, B. *Proceedings of the 67th International Water Conference* 2007, IWC 06, 34.

Rosenberg, E.; Hughes, M.; Neilsen, D.; Gobetto. R.; Viale, A.; Burton, S. D.; Ferel, J. Structural Investigations of Silica Polyamine Composites: Surface Coverage, Metal Ion Co-ordination, and Ligand Modification. *Ind. Eng. Chem. Res.,* 2006, 45(19), 6538-6547.

Rosengrant, L.; Fargo, L. Final Best Demonstrated Available Technology (BDAT) Background Document for K031, K084, K101, K102, Characteristic Arsenic Wastes (D004) Characteristic Selenium Wastes (D010) and P and U Wastes Containing Arsenic and Selenium Listing Constituents Volume 1. *EPA/530/SW-90/059A.,* 1990, 124 pp.

Sarkar, S.; Blaney, L. M.; Gupta, A.; Ghosh, D.; SenGupta, A. K. Use of ArsenX$^{np}$, a Hybrid Anion Exchanger, for Arsenic Removal in Remote Villages in the Indian Subcontinent. *Reactive & Functional Polymers,* 2007, 67(12), 1599-1611.

Shaw, J. K.; Fathordoobadi, S.; Zelinski, B. J.; Ela, W. P.; Saez, A. E. Stabilization of Arsenic-Bearing Solid Residuals in Polymeric Matrices. *Journal of Hazardous Materials,* 2008, 152(3), 1115-1121.

Shiraishi, Y.; Nishimura, G.; Hirai, T.; Komasawa, I.; Separation of Transition Metals using Inorganic Adsorbents Modified with Chelating Ligands. *Industrial & Engineering Chemistry Research,* 2002, 41(20), 5065-5070.

Streat, M. Applications of Ion Exchange in Hydrometallurgy. *NATO ASI Series, Series E: Applied Sciences,* 1986, 107, 449-461 (Ion Exch. Sci. Technol.).

Sun, H.; Wang, L.; Zhang, R.; Sui, J.; Xu, G. Treatment of Groundwater Polluted by Arsenic Compounds by Zero Valent Iron. *Journal of Hazardous Materials,* 2006, 129, 297-303.

Suzuki, T. M.; Tanaka, D. A. P.; Tanco, M. A. L.; Kanesato, M.; Yokoyama, T. Adsorption and Removal of Oxoanions of Arsenic and Selenium on the Zirconium(IV) Loaded Polymer Resin Functionalized with Diethylenetriamine-N,N,N,N-Polyacetic Acid. *J. Environ. Monit.,* 2000, 2, 550-555.

Vatutsina, O. M.; Soldatov, V. S.; Sokolova, V. I.; Johann, J.; Bissen, M.; Wiessenbacher, A. A New Hybrid (Polymer/Inorganic) Fibrous Sorbent for Aresenic Removal from Drinking Water. *Reactive & Functional Polymers,* 2007, 67, 184-201.

Zagorodni, A. A.; Kotova, D. L.; Selemenev, V. F. Infrared Spectroscopy of Ion Exchange Resins: Chemical Deterioration of the Resins. *Reactive & Functional Polymers,* 2002, 53, 157-171.

Zagorodni, A. A. *Ion Exchange Materials Properties and Applications;* Elsevier: Oxford, UK; 2007, Chapter 11, 243-262.

The invention claimed is:

1. A resin for removing at least one metal from a liquid solution, the resin comprising:
   a matrix-polyamine base, said matrix-polyamine base comprising the reaction product of a polyamine with a short chain hydrocarbylsilyl formed from first silanizing a matrix surface by hydrating said surface and reacting said hydrated surface with a short chain trifunctional silane having (a) hydrocarbon substituents containing 1-6 carbon atoms, (b) trifunctional leaving groups providing sites for covalently bonding said hydrocarbylsilyl to said matrix surface through Si—O bonds, and (c) terminal leaving groups providing sites for covalently bonding said polyamine to said hydrocarbylsilyl through N-hydrocarbyl bonds; and secondly reacting said polyamine with said hydrocarbylsilyl formed from the silanization of said hydrated surface so as to form an aminohydrocarbyl polymer covalently bound to said matrix surface, said aminohydrocarbyl polymer having non-crosslinked amino groups multisite bound to said hydrocarbylsilyl;
   wherein the matrix-polyamine base is functionalized with phosphorus acid by the Mannich reaction to form an amino phosphonic acid ligand, and is then surface-bound with zirconium.

2. The resin of claim 1, wherein said at least one metal is arsenic.

3. (original: The resin of claim 1, wherein said silane is chloropropyl trichlorosilane.

4. The resin of claim 1, wherein said silane is a mixture of methyl trichlorosilane and chloropropyl trichlorosilane.

5. A method of selectively removing arsenic from a liquid solution, comprising the steps of applying the solution to a resin, the resin comprising:
   a matrix-polyamine base, said matrix-polyamine base comprising the reaction product of a polyamine with a short chain hydrocarbylsilyl formed from first silanizing a matrix surface by hydrating said surface and reacting said hydrated surface with a short chain tri-functional silane having (a) hydrocarbon substituents containing 1-6 carbon atoms, (b) trifunctional leaving groups providing sites for covalently bonding said hydrocarbylsilyl to said matrix surface through Si—O bonds, and (c) terminal leaving groups providing sites for covalently bonding said polyamine to said hydrocarbylsilyl through N-hydrocarbyl bonds; and secondly reacting said polyamine with said hydrocarbylsilyl formed from the silanization of said hydrated surface so as to form an aminohydrocarbyl polymer covalently bound to said matrix surface, said aminohydrocarbyl polymer having non-crosslinked amino groups multi-site bound to said hydrocarbylsilyl;
   wherein the matrix-polyamine base is functionalized with phosphorus acid by the Mannich reaction to form an amino phosphonic acid ligand, and is then surface bound with zirconium.

6. The method of claim 5, wherein said silane is chloropropyl trichlorosilane.

7. The method of claim 5, wherein said silane is a mixture of methyl trichlorosilane and chloropropyl trichlorosilane.

8. A composite for removing at least one metal from an aqueous solution comprising:
   a silica polyamine composite functionalized with phosphorus acid by the Mannich reaction to form an amino phosphonic acid ligand; and
   zirconium bound to the surface of the functionalized silica polyamine composite.

9. The compound of claim 8, wherein said silica polyamine composite comprises a silica gel in combination with polyallylamine.

10. The composite of claim 8, wherein said at least one metal is arsenic.

11. The method of claim 5, wherein said liquid solution has a pH of from about 2 to about 8.

* * * * *